US010404298B2

(12) United States Patent
Meller et al.

(10) Patent No.: US 10,404,298 B2
(45) **Date of Patent: *Sep. 3, 2019**

(54) INGRESS CANCELLATION TACHOMETER

(71) Applicant: Cisco Technology, Inc., San Jose, CA (US)

(72) Inventors: Richard Meller, Sunnyvale, CA (US); Glendon L. Akins, III, Ft. Collins, CO (US); Denis Downey, Pleasanton, CA (US); James An, Sunnyvale, CA (US); Koen Van Renterghem, Lovendegem (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,767

(22) Filed: Oct. 11, 2017

(65) Prior Publication Data

US 2018/0034490 A1 Feb. 1, 2018

Related U.S. Application Data

(62) Division of application No. 14/048,101, filed on Oct. 8, 2013, now Pat. No. 9,800,276.

(51) Int. Cl.

| | |
|---|---|
| ***H04B 1/10*** | (2006.01) |
| ***H04J 11/00*** | (2006.01) |
| ***H04L 27/26*** | (2006.01) |
| *H04L 25/03* | (2006.01) |

(52) U.S. Cl.
CPC ............ *H04B 1/10* (2013.01); *H04J 11/0066* (2013.01); *H04L 27/265* (2013.01); *H04L 25/03038* (2013.01)

(58) Field of Classification Search
CPC ............................ H04B 1/10; H04L 25/03019
USPC ........................................ 375/316, 350, 330
See application file for complete search history.

(56) References Cited

U.S. PATENT DOCUMENTS

| | | | | |
|---|---|---|---|---|
| 4,029,271 | A | 6/1977 | Murphy et al. | |
| 5,058,081 | A | 10/1991 | Gulli et al. | |
| 5,133,013 | A | 7/1992 | Munday | |
| 5,239,560 | A | 8/1993 | Daniel | |
| 7,177,614 | B2 | 2/2007 | Agarwal et al. | |
| 7,277,475 | B1 * | 10/2007 | Nguyen | H04B 1/1036 375/144 |
| 7,860,476 | B1 | 12/2010 | Karr et al. | |
| 9,800,276 | B2 * | 10/2017 | Meller | H04B 1/10 |
| 2005/0097228 | A1 * | 5/2005 | Flautner | G06F 1/3203 710/1 |
| 2008/0123739 | A1 * | 5/2008 | Reznic | H04L 27/2604 375/240.08 |

(Continued)

*Primary Examiner* — Kevin M Burd
(74) *Attorney, Agent, or Firm* — Merchant & Gould P.C.

(57) ABSTRACT

Indication of an amount of processing performed in detection and removal of ingress noise may be provided. A frequency domain representation of a narrowband region of a digital input signal may be received. The received frequency domain representation of the narrowband region may be compared with a predetermined threshold. Results from the comparison of the received frequency domain representation of the narrowband region with the predetermined threshold may be aggregated. Based on the aggregated results, an indication of an amount of processing performed by an ingress exciser in removing the ingress noise may be provided.

20 Claims, 6 Drawing Sheets

(56) References Cited

U.S. PATENT DOCUMENTS

| | | | | |
|---|---|---|---|---|
| 2010/0273520 | A1* | 10/2010 | Pelletier | H04L 5/0007 455/522 |
| 2012/0083218 | A1 | 4/2012 | Gossain et al. | |
| 2012/0281772 | A1* | 11/2012 | Bailey | H03F 1/3247 375/259 |
| 2013/0231923 | A1 | 9/2013 | Zakarauskas et al. | |
| 2015/0098534 | A1 | 4/2015 | Meller et al. | |

* cited by examiner

INGRESS CANCELLATION TACHOMETER

RELATED APPLICATION

This application is a Division of co-pending U.S. application Ser. No. 14/048,101 filed Oct. 8, 2013 entitled "Ingress Cancellation Tachometer" is incorporated herein by reference.

TECHNICAL FIELD

The present disclosure relates ingress noise detection and removal in a cable plant.

BACKGROUND

In various types of networks, narrow band interfering signals can inject themselves into a spectrum. These narrow band interfering signals are referred to as ingress noise. In burst mode types of communication protocols, such as time division multiple access (TDMA), narrow band ingress can occupy and hinder numerous frequencies where spectrum is at a premium. For example, such narrow band ingress can occupy the up-stream band of cable data communication systems, such as employing a version of the Data Over Cable Service Interface Specification (DOCSIS) standard. Thus, in modern high bandwidth DOCSIS networks, it is no longer practical to avoid frequencies where such narrow band ingress is present. This narrow band ingress degrades the demodulation fidelity of up-stream burst signals that encompass the ingress in DOCSIS systems such that the modulation error ratio (MER) is too low causing unacceptably high symbol/bit errors.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
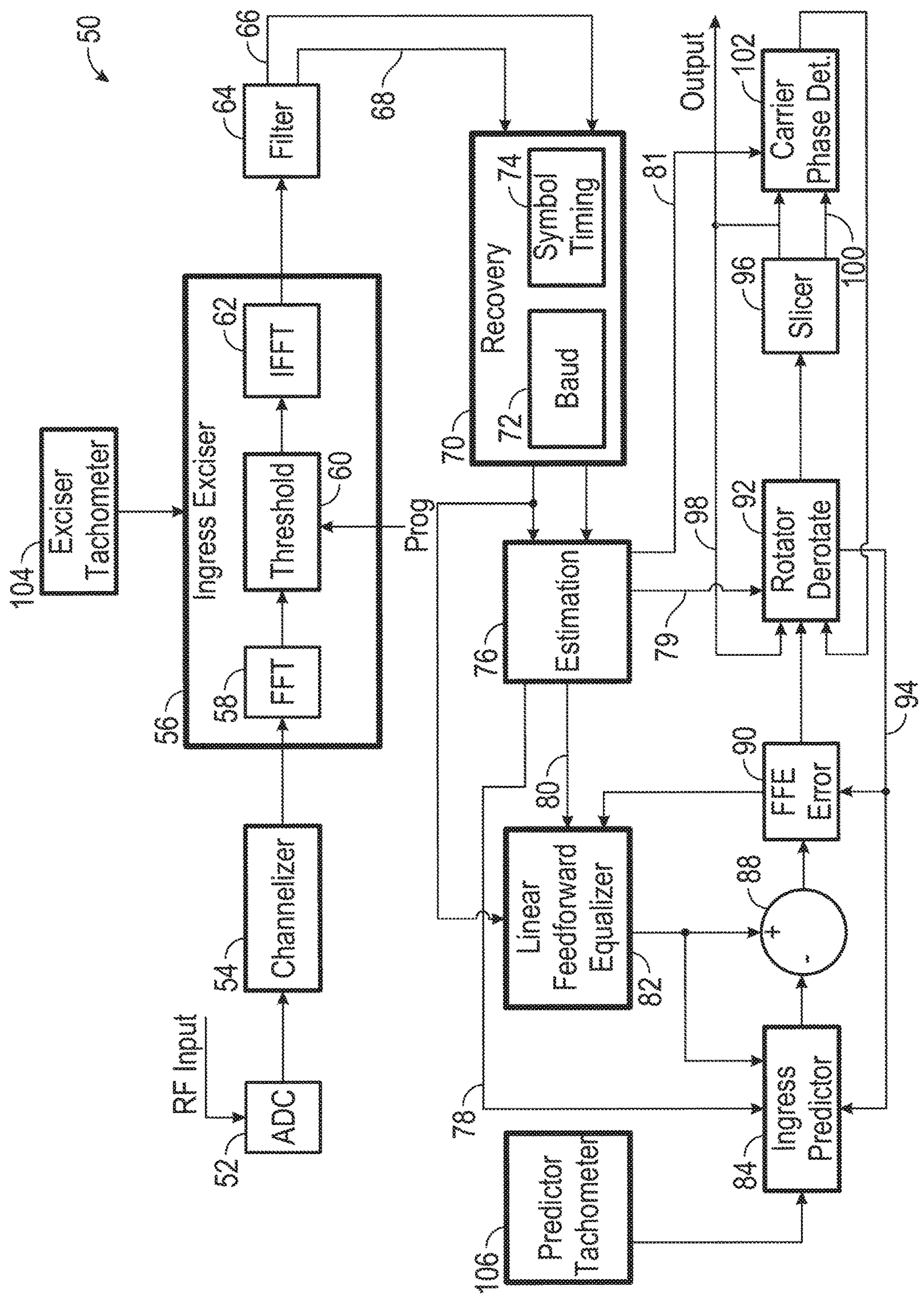
FIG. 1 is a block diagram of a demodulator in accordance with at least one example embodiment.

Indication of an amount of processing performed in detection and removal of ingress noise may be provided. A frequency domain representation of a narrowband region of a digital input signal may be received. The received frequency domain representation of the narrowband region may be compared with a predetermined threshold. Results from the comparison of the received frequency domain representation of the narrowband region with the predetermined threshold may be aggregated. Based on the aggregated results, an indication of an amount of processing performed by an ingress exciser in removing the ingress noise may be provided.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding operations to the disclosed methods. Accordingly, the following detailed description does not limit the disclosure. Instead, the proper scope of the disclosure is defined by the appended claims.

A cable system may include a cable modem termination system (CMTS) implemented at a headend of a cable plant. The CMTS may communicate information with subscriber equipment (e.g., consumer premises equipment) via a cable network. The cable network may include physical (e.g., optical and electrically conductive) connections and/or wireless links (e.g., cellular, WLAN, WMAN, WiMax or the like) extending between the subscriber equipment and the CMTS.

The CMTS may be configured to communicate with the subscriber equipment both upstream and downstream. For example, the CMTS may be configured to send data downstream to one or more modems associated with the subscriber equipment. The CMTS may also be configured to receive data sent from the one or more modems upstream. The one or more modems may be connected to the CMTS via the cable network comprising a hybrid fiber-coaxial (HFC) network. The HFC network may include a combination of fiber-optic lines (e.g. located between the CMTS and the modems) and coaxial cable lines (e.g. located downstream from the CMTS).

In the HFC network, ingress noise may be introduced from equipment used in the HFC network. For example, ingress noise in the HFC network may be introduced as radio frequency (RF) emissions from electrical appliances, loose cable connections, radio transmissions on the network cables, and RF interference from electrical devices entering via a cable ground, for example. Noise may be reduced by replacing the coaxial portions of the HFC network with fiber-optic lines. However, conversion of the entire HFC network to fiber optic technology may not be feasible.

To detect and reduce the ingress noise, the CMTS may include a demodulator. The demodulator may be configured to demodulate reverse path signals transmitted by the one or more of modems within a prescribed frequency band (e.g., 5-85 MHz band). For example, the demodulator may be configured to cancel narrowband ingress within the prescribed frequency band.

FIG. 1 is a block diagram of a demodulator 50 that may implement ingress noise cancellation consistent with embodiments of the disclosure. Demodulator 50 may demodulate a modulated RF input signal that includes content provided by a burst modulator and interference provided by a narrowband ingress noise source. Demodulator 50 may include an analog-to-digital converter (ADC) 52 to sample the RF input signal within a predetermined frequency band (e.g., the 5-85 MHz band) and provide a quantized representation of the RF input. A channelizer 54 may be configured to convert the digital signal to a corresponding baseband representation of the signal at a desired baud rate. For example, channelizer 54 may be configured to perform complex down conversion to remove any carrier in the 5-85 MHz band and translates the frequency to baseband. Channelizer 54 can also be configured to perform a decimation and filtering operation to convert the high ADC sample rate down to reduced rate, such as at least 2× the desired baud/chip rate.

Once the signal has been converted to base-band, decimated and filtered, an ingress exciser 56 may perform ingress excision. Ingress exciser 56 may be configured to notch out strong levels of ingress that may be evaluated according to a carrier-to-ingress ratio (CIR). In some examples, the threshold of the ingress exciser may be set to remove ingress from the signal within a predefined notch of frequencies that have a CIR that is less than about −10 dBc (decibels relative to the carrier). In addition to removing ingress interference from the desired signal, ingress exciser 56 may help to protect the rest of the signal processing chain in demodulator 50 from over-load/clipping. Ingress exciser 56 thus may enable demodulator 50 to achieve robust demodulation performance in the presence of very strong ingress since ingress prediction (and subtraction) alone would suffer from poor performance at these very strong levels of ingress.

As a further example, ingress exciser 56 may include a fast Fourier transform (FFT) 58 to convert the signal to the frequency domain, such as including a plurality of frequency bins. A threshold 60 may be applied to remove frequencies within a specified notch that exceeds a specified CIR level, such as mentioned above. For example, each frequency bin within the narrowband having a magnitude that exceed the programmable threshold may be cancelled, such as by multiplying the bin by an excision factor (e.g., zero). The excision may be zero or set to another programmable low value that is less than one and chosen to substantially remove most (e.g., about 90% or more) of the narrowband ingress for each bin that exceeds the excision threshold. For the example of a DOCSIS burst having a given max bin level, an excision threshold for excising narrowband ingress may be set at about 10% greater (or more) than the given max bin level of the burst signal. The excision threshold may also be programmable, such as may be in response to a user input. In other examples, the excision threshold may be automatically set (e.g., periodically) to a predetermined level (e.g., 10%) greater than an average maximum bin level of the burst signal. Scaling of the FFT bins also can be performed. For instance, scaling (e.g., about ½ or other fractional portion) may be applied following excision, such as to reduce the level of bins adjacent (e.g., before and after) the excised bins that exceeded the threshold, such as to smooth the exciser response. In this way, high amplitude ingress within a predetermined notch (or multiple notches) frequency range can be cancelled. Ingress exciser 56 may also include an IFFT block 62 that may convert the frequency domain signal, absent excised ingress, back to a digital time domain representation. Ingress exciser 56 may provide the digital time domain representation of the excised signal downstream for further demodulation processing.

A filter block 64 may be configured to filter the signal from ingress exciser 56 such as to provide a matched filter response 66 and a pre-filter signal 68. For example, filter block 64 may be implemented as a SQRT-RC Nyquist filter and pre-filter block whose functions are to create a matched filter response with the burst modulator source as well as a pre-filter to help with the baud/chip tracking process. The output of filter block 64 may feed a recovery network 70. Recovery network 70 may include symbol timing recovery 74 and baud block 72. Symbol timing recovery 74 may be configured to implement baud/chip tracking by detecting a preamble of the burst mode signal. That is, the symbol timing recovery may enable demodulator 50 to detect and lock on to a valid burst (e.g., a valid DOCSIS burst) as compared to triggering on impulse/burst noise or some other non-DOCSIS signal received at the input. The symbol timing recovery block thus may output an interpolation factor, Mu, which feeds the baud block 72. Symbol timing recovery 74 may also provide an enable signal (e.g., a logic output of 1 or 0) to indicate a valid burst condition. The enable signal can feed the rest of the demodulation circuitry for operating on valid bursts. Symbol timing recovery 74 may also produce an estimation bus signal, which feeds an estimation block 76. Baud block 72 may also fine tune the correct baud/chip sampling times based on the interpolation factor from symbol timing recovery 74. The fine tune estimate of the recovered signal from baud block 72 thus may help to maximize MER performance.

An estimation block 76 may be configured to provide signal estimates and timing for downstream processing based on the symbol estimate and the fine tune estimate from recovery network 70. For example, estimation block 76 may include estimation blocks to provide a burst timing signal 78, a magnitude estimate signal 80, a signal phase estimate 79 and a carrier frequency offset (CFO) estimate 81, which signals feed various processing blocks as disclosed herein.

A linear feedforward equalizer 82 may be configured to implement gain scaling and adaptively equalization on magnitude estimate signal 80 fine-tuned filtered signal from recovery network 70. For example, linear feedforward equalizer 82 may include a linear T-spaced equalizer to adaptively equalize the signal estimates (estimated magnitude and fine-tuned estimate) to provide an adaptively equalized signal (e.g., corresponding to the desired signal plus ingress) to an ingress predictor 84 and to a subtractor 88. For example, the linear T-spaced equalizer may include a set of tap coefficients programmed to linearly weight samples of the signal estimates according to an equalization algorithm (e.g., least mean square). The tap coefficients of linear feedforward equalizer 82 may be periodically sent to specific cable modems in the forward path signal according to a schedule, such as part of a ranging process. The tap coefficients may be utilized for configuring each cable modem's reverse path transmit pre-equalization.

Burst timing signal 78 from estimation block 76 may also drive ingress predictor 84 along with a re-rotated signal (e.g., the desired signal without ingress) to compute an output corresponding to predicted ingress noise. Ingress predictor 84 may provide the predicted ingress to a negative input of a subtractor 88. Subtractor 88 may subtract the predicted ingress from the adaptively equalized signal to produce a desired signal that is substantially free of narrowband ingress. The re-rotation (e.g., by rotator 92) may be utilized to adjust for signal rotation due to a finite carrier offset in the signals at this stage.

Subtractor 88 may provide the desired signal to a FFE error block 90. FFE error block 90 may provide an error estimate back to linear feedforward equalizer 82 based on the ingress free signal and the re-rotated signal. FFE error block 90 may also provide an output quantization signal to a rotator 92. As mentioned, rotator 92 may be configured to provide a re-rotated output to ingress predictor 84 and to FFE error block 90 based on a slicer output corresponding to the demodulated output and a phase output of demodulator 50. Rotator 92 may also provide a de-rotated output of soft decision estimates to an input of a slicer 96. Slicer 96 may also receive the burst-T signal to generate an output that includes a hard decision output 98, corresponding to demodulated output, and an associated error 100. Slicer 96 output 98 and output 100 may be unrotated relative to re-rotated signal 94 that may be provided to ingress predictor 84. A carrier phase detect block 102 in turn may provide a phase detect output based on slicer 96 output 98 and output 100 and a CFO estimate 81 from estimation block 76. The output from carrier phase detect block 102 may be fed back to rotator 92 at valid burst conditions. CFO estimate 81 may thus work with the carrier phase detect block to mitigate residual carrier frequency offsets in output 98.

The phase estimate signal may work with rotator 92 to achieve zero carrier phase set. The CFO estimate 81 may work with gain scale and linear feedforward equalizer 82 to place the signal at the correct amplitude. The burst timing signal may work to establish selected signal times (e.g., preamble area, data area and quiet time area) for various blocks in demodulator 50.

Demodulator 50 may further include an exciser tachometer 104 and a predictor tachometer 106. Exciser tachometer 104 may be connected to ingress exciser 56 and may be configured to provide an indication of an amount of processing performed by ingress exciser 56 during the excision of ingress noise. Exciser tachometer 104 is described in more detail below with respect to FIG. 2. Predictor tachometer 106 may be connected to ingress predictor 84 and may be configured to provide an indication of an amount of processing performed by ingress predictor 84 during ingress noise removal. Predictor tachometer 106 is described in greater detail below with respect to FIG. 3.

Figure 2:
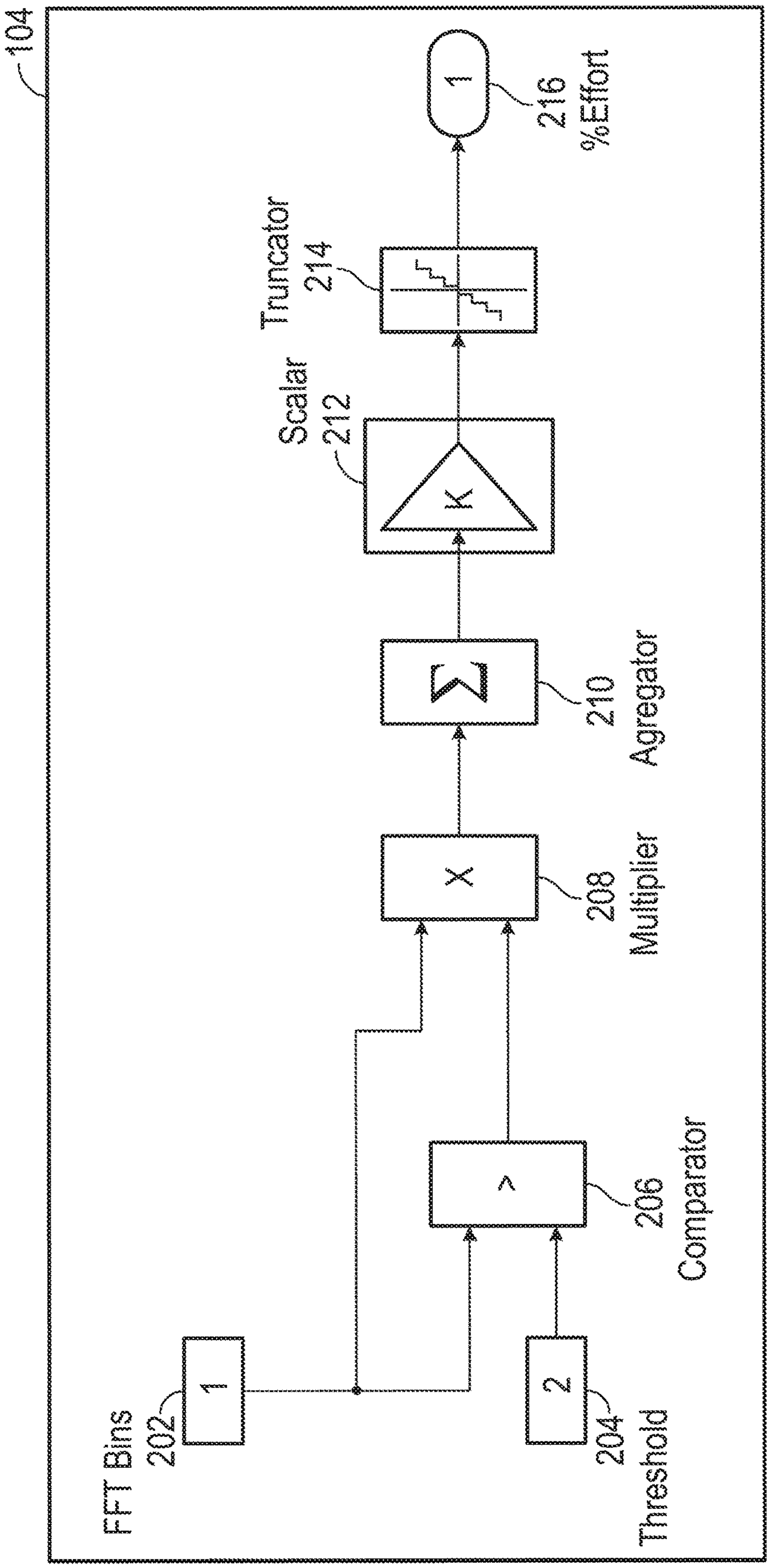
FIG. 2 is a block diagram of an exciser tachometer in accordance with at least one example embodiment.

FIG. 2 is a block diagram of exciser tachometer 104. As shown in FIG. 2, exciser tachometer 104 may comprise FFT bins 202, a threshold 204, a comparator 206, a multiplier 208, and an aggregator 210. Exciser tachometer 104 may further include a scalar 212, a truncator 214, and a truncator output 216. Exciser tachometer 104 may be configured to compute and provide an indication of relative amount of processing performed by ingress exciser 56 in detection and removal of ingress noise. For example, exciser tachometer 104 may be configured to provide the indication on a percentage scale or on a carrier to interference ratio (CIR) scale. Exciser tachometer 104 may be configured to receive data corresponding to the ingress noise from ingress exciser 56 and analyze the received data to determine the indication of the amount of processing performed by ingress exciser 56 in removing the ingress noise. For example, exciser tachometer 104 may receive and analyze a frequency domain representation of a selected narrowband region of the input signal from FFT 58.

The frequency domain representation of the selected narrowband region of the input signals from FFT 58 may be received at comparator 206. For example, frequency domain representation data may be accessed from FFT bins 202 of FFT 58. Comparator 206 may be configured to compare FFT bins 202 with threshold 204. Threshold 204 may be configurable and may be configured either for each of FFT bins 202 individually or as an overall threshold value applicable for each of FFT bins 202. For example, threshold 204 may be configured by a plant operator. A threshold used by ingress exciser 56 for excising the ingress noise may be used as threshold 204 by exciser tachometer 104.

Comparator 206 may be a digital comparator and may provide a digital output corresponding to the comparison. For example, when a bin value is less than threshold 204, comparator 206 may provide the output as digit 1. When a bin value is more than threshold 204, comparator 206 may provide output as a digit 0.

Multiplier 208 may receive the outputs from comparator 206 and multiply the received outputs with a corresponding bin value. For example, for each of FFT bins 202, multiplier 208 may multiply the output from comparator 206 with the bin value. The output from multiplier 208 may be provided as an input for aggregator 210. Aggregator 210 may be configured to aggregate the output from multiplier 208. For example, aggregator 210 may be configured to aggregate the outputs corresponding to each of FFT bins 202.

Output from aggregator 210 may be provided as input for scalar 212. Scalar 212 may be configured to scale the output from aggregator 210 based on a scaling factor. For example, scalar 212 may scale the output from aggregator 210 on a percentage scale. The scaling factor may be reconfigurable and predefined by a plant operator. The output from scalar 212 may be provided as input for truncator 214. Truncator 214 may truncate the output from scalar 212 when the output is not within a predetermined range. For example, truncator 214, when output from scalar 212 is on a percentage scale is more than 100%, may truncate it to a maximum of 100% value. The output from truncator 214 may be provided as output indicative of an amount of processing performed by ingress exciser 56 during excision of ingress noise.

Figure 3:
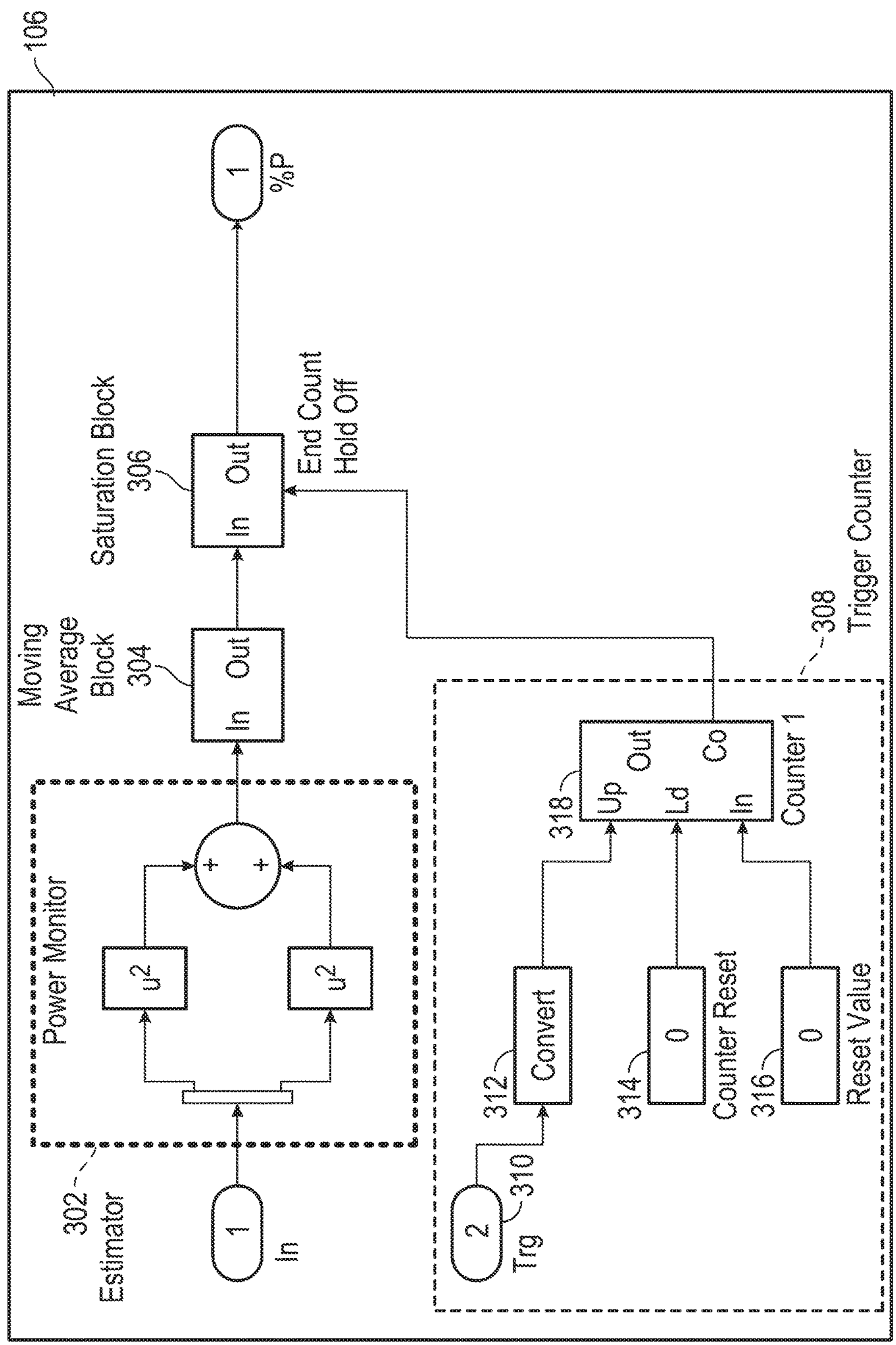
FIG. 3 is a block diagram of a predictor tachometer in accordance with at least one example embodiment.

FIG. 3 is a block diagram of predictor tachometer 106. As shown in FIG. 3, predictor tachometer 106 may include a power monitor 302, a moving average block 304, a saturation block 306, and a trigger counter 308. Power monitor 302 may be configured to measure power in a selected spectral region of the input signal. For example, power monitor 302 may provide an indication of power for the selected spectral region of the input signal. Power monitor 302 may include a power function configured to implement one or more mathematical functions on the narrowband region of the input signal to calculate an indication of power in the narrowband signal. For example, the power function may perform a squaring function on the narrow band spectrum, such as to square the complex magnitude (e.g., corresponding to $\sqrt{u^2+v^2}$, where u is the real component and v is the imaginary component) of the narrowband spectrum. The squaring function of the power function thus may be utilized to compute a corresponding complex magnitude of the narrowband input signal that is functionally related to power of the narrowband region of the signal.

The output from power monitor 302 may be provided as an input to moving average block 304. Moving average block 304 may be configured to compute a moving average of the narrow band spectral power calculated by power monitor 302. For example, moving average block 304 may be implemented as an impulse response (IR) filter with programmable decay rates. The decay rates may vary based on changes with background noise and impulse burst noise, for example. Moving average block 304 may provide an indication of the measured power (e.g., a time averaged power measurement) to saturation block 306.

Saturation block 306 may be configured to control the range of the output power for the narrow bound signal provided by moving average block 304. Saturation block 306 may be programmable. For example, saturation block 306 may quantize the power measure signal and keep it within predetermined upper and lower bounds.

Saturation block 306 may further be configured to convert the input power into a percentage using a gain scale. For example, saturation block 306 may convert the input power value on a percentage scale or a carrier to interference ratio (CIR) scale. The converted value may provide an indication of the amount of processing performed by ingress predictor 84 during ingress noise removal process.

Trigger counter 308 may be configured to control the output of moving average block 304. For example, trigger counter 308 may be configured to provide a signal to release the moving average value from moving average block 304. Trigger counter 308 may include a burst trigger 310, a converter 312, a counter reset block 314, a reset value block 316, and a counter 318.

Trigger counter 308 may be configured to generate duration count data that may indicate a duration of a given triggered event. For example, trigger counter 308 may be implemented as a timer or count circuit that may be set to track the time between the beginning and end of a respective burst noise event. Trigger counter 308 may be configured to operate relative to a local time base, such as a system clock (e.g., implemented in a receiver). Trigger counter 308 may be reset in response to a duration reset input, such as received from reset value block 316. For example, the duration count output may correspond to a total number of clock cycles spanning between the beginning and end of a given burst noise event. Trigger counter 308 may track a running count value based on the trigger output indicating the occurrence of a burst noise event.

Counter 318 may increment for each clock cycle (or for a predetermined number of clock cycles) while enabled by trigger counter 308 output during a respective burst noise event. Moreover, the duration count may specify a burst duration for each burst noise event, such as mentioned above. The duration output may include a cumulative burst noise duration (e.g., total accumulated time of burst noise) from a predefined start time. The start time may be since power up or another reset event in response to the duration reset input from reset value block 316.

Indications from exciser tachometer 104 and predictor tachometer 106 may be used to determine statistics associated with the burst noise. Other devices (e.g., by a controller or a processor) operating in a communication system may use the indications for scheduling diagnostics or other control functions. For example, the indications from exciser tachometer 104 and predictor tachometer 106 may be combined to provide a combined tachometer reading for demodulator 50. The combined tachometer reading may be indicative of the overall processing performed by demodulator 50 in removing the ingress noise.

The indications may be used to select a frequency for further analysis by a burst detector and a spectrum analyzer, as described below with respect to FIG. 4. For example, based on the combined tachometer reading, the upstream channels may be moved to another frequency region. By moving the upstream channel to another frequency region, a break in the data, data corruption, or loss of data because of the ingress noise may be avoided.

Figure 4:
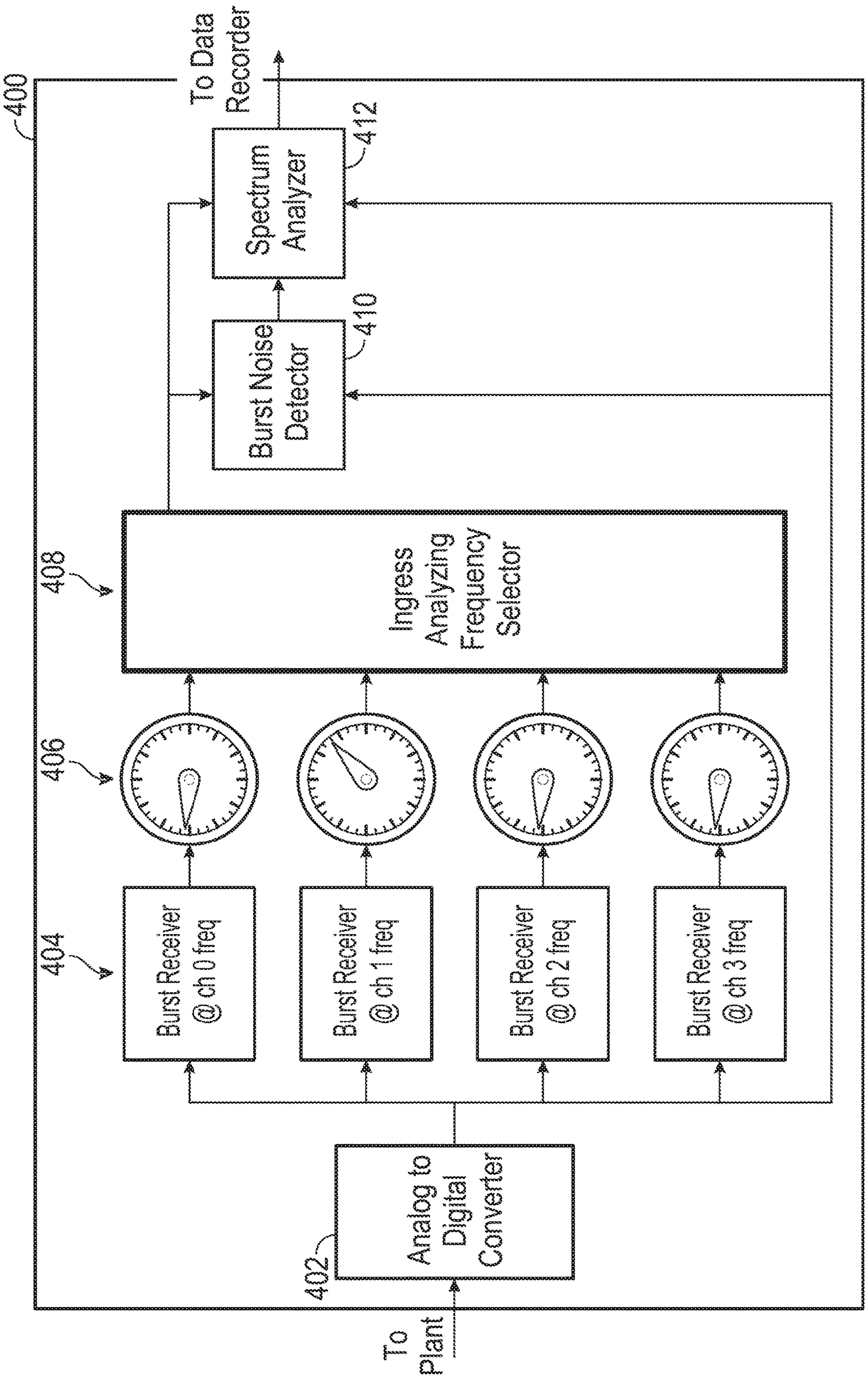
FIG. 4 is a block diagram of an apparatus for managing narrowband ingress in accordance with at least one example embodiment.

FIG. 4 is a block diagram of an ingress noise management system 400. System 400 may use exciser tachometer 104 and predictor tachometer 106 to manage resources available for burst detection and removal. Moreover, system 400 may further analyze ingress noise using spectrum analyzers.

As shown in FIG. 4, system 400 may include an analog to digital converter (ADC) 402. ADC 402 may be configured to sample the RF input signal within a predetermined frequency band (e.g., the 5-85 MHz band) and provide a quantized representation of the RF input. System 400 may further include a channelizer (not shown) configured to convert the digital signal to a corresponding baseband representation of the signal at a desired baud rate. For example, the channelizer may be configured to perform complex down conversion to remove any carrier in the 5-85 MHz band and translates the frequency to base-band.

Once the signal has been converted to base-band, decimated and filtered, it may be fed to burst receivers 404. Each of burst receivers 404 may include a tuner and an ingress detection and removal block. The tuner may tune to a channel based on signal interference or noise information (e.g., signal-to-noise ratio (SNR), bit error rate (BER)) that may have been determined by associated monitoring components. An output from the tuner may be fed into the ingress detection and removal block. The ingress detection and removal block may include an ingress exciser, a feed-forward equalizer, and an ingress predictor for removing ingress from the input signal.

Each of the bursts receivers 404 may be monitored by at one of a plurality of tachometers 406. Each of the plurality of tachometers 406 may be configured to detect and compute a value that may indicate a relative amount of processing performed by the ingress detection and removal block to remove the ingress noise sources on the selected channel. With little ingress on the plant, plurality of tachometers 406 may read close to 0%. When ingress occurs, however, the readings on the affected channel may increase.

Outputs of the plurality of tachometers 406 may be monitored by an ingress analyzing frequency selector 408. For example, ingress analyzing frequency selector 408 may be configured to continuously monitor and compare the tachometers 406 readings with a predetermined threshold. When one of the plurality of tachometers 406's reading reaches the predetermined threshold, a burst noise detector 410 and a spectrum analyzer 412 may be allocated to the channel where ingress interference is occurring.

Spectrum analyzer 412 may analyze the input signal and provide corresponding analysis data to a data recorder. Spectrum analyzer 412 may perform spectral analysis for a selected region of the assigned channel. For example, spectrum analyzer 412 may be configured to analyze the noise signal to determine a source of the signal. The region or channel selected for spectrum analysis may be the same frequency that is selected and in which the burst is detected by burst noise detector 410. Moreover, the selected region may correspond to a frequency that may be different than the frequency selected for burst detection. For example, an output of the FFT 58 inside the burst demodulator's ingress detection and removal block may be queried to determine the center frequency of the ingress noise. The center frequency of spectrum analyzer 412 may then be tuned to the center frequency of the ingress noise.

System 400 may schedule a quiet time on the channel with ingress noise. During the quiet time, burst noise detector 410 and spectrum analyzer 412 may be armed for trigger and data capture. The outputs of burst noise detector 410 and spectrum analyzer 412 may be fed to a data capture block where the data may be stored and then may be recalled and presented over time to the plant operator. For example, based on the output from spectrum analyzer 412, the plant operator may plan to mitigate the source of the noise signal or the effects of the noise signal.

Figure 5:
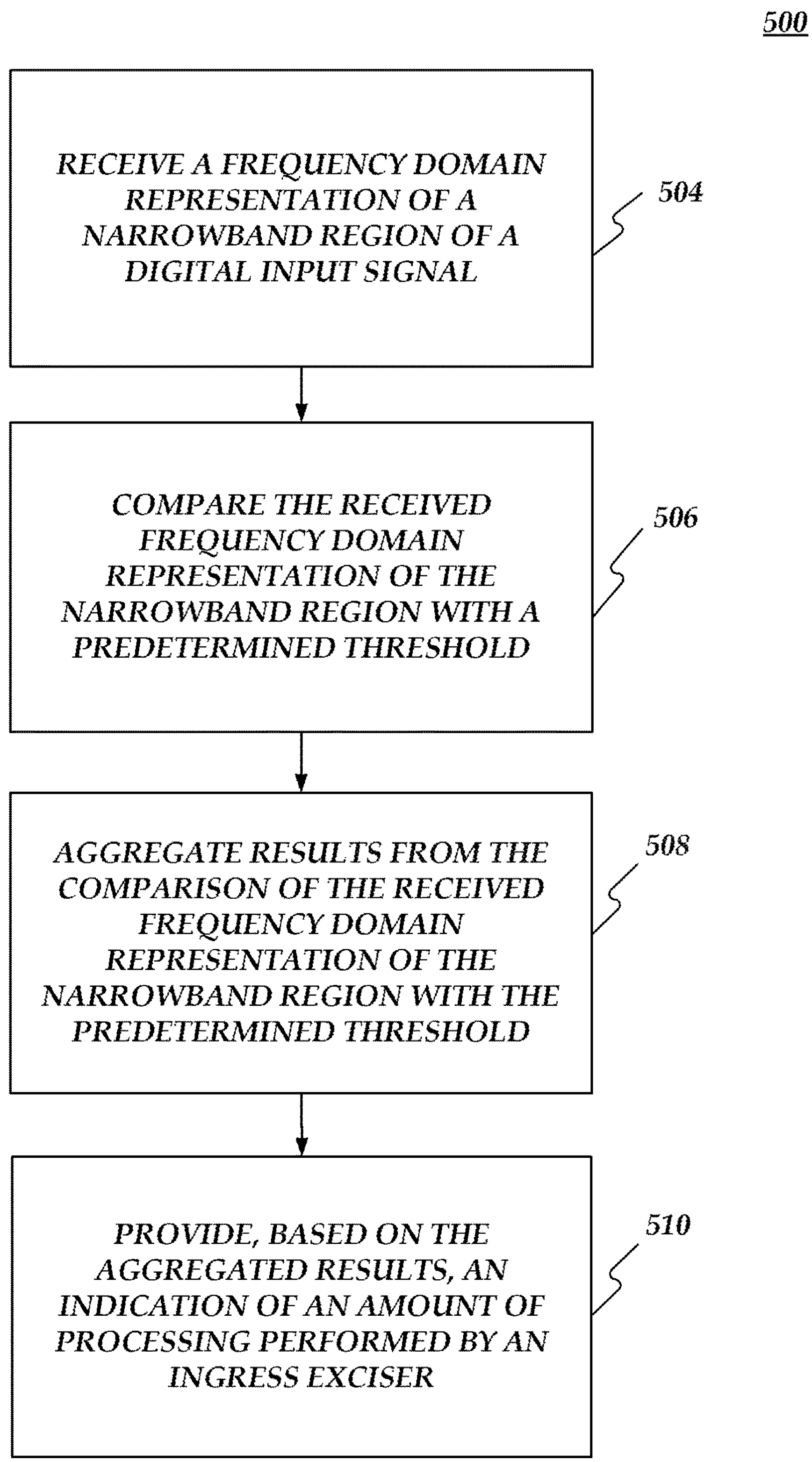
FIG. 5 is a flow diagram of a method to manage narrowband ingress on a cable plant in accordance with at least one example embodiment.

FIG. 5 is a flow chart setting forth the general operations involved in a method 500 consistent with an embodiment of the disclosure for providing an indication of processing performed by ingress exciser 56 in excising ingress noise from the input signal. Method 500 may be implemented, for example, using exciser tachometer 104 as described above with respect to FIG. 2. Ways to implement the operations of method 500 will be described in greater detail below.

In method 500, at operation 504, comparator 206 may receive a frequency domain representation of a narrowband region of the digital input signal. For example, the frequency domain representation of the narrowband region of the input signal may be received from FFT 58 of ingress exciser 56. The frequency domain representation may be received from FFT bins 202 at comparator 206.

In operation 506 comparator 206 may compare the received frequency domain representation of the narrowband region with a predetermined threshold. For example, comparator 206 may compare the contents of FFT bins 202 with threshold 204. Comparator 206 may compare each of FFT bins 202 with threshold 204 and provide a digital output as a result of the comparison. For example, when one of FFT bins 202 is more than threshold 204, comparator 206 may provide the output as a digital 1. When one of FFT bins 202 is less than threshold 204, comparator 206 may provide an output as a digital 0.

In operation 508, aggregator 210 may aggregate the results from the comparison of the received frequency domain representation of the narrowband region with the predetermined threshold. For example, aggregator 210 may aggregate outputs from comparator 206 corresponding to the comparison of each of the plurality of FFT bins 202 with threshold 204.

Consistent with the embodiments of the disclosure, before aggregating, the outputs from comparator 206 may be multiplied by the corresponding ones of the plurality of FFT bins 202 before aggregation. For example, multiplier 208 may receive output from comparator 206 for each of the plurality of FFT bins 202 and may respectively multiply the output by corresponding ones of the plurality of FFT bins 202. By multiplying the output from comparator 206 with the corresponding ones of the plurality of FFT bins 202, multiplier 208 may eliminate ones of the plurality of FFT bins 202 that may not be excised by ingress exciser 56. For example, a one of the plurality of FFT bins 202 having a value less than threshold 204 may not be excised.

In operation 510, exciser tachometer 104 may provide an indication of an amount of processing performed by ingress exciser 56. For example, the indication may be provided on a percentage scale or on a carrier to interference ratio (CIR) scale. Output from aggregator 210 may be provided to scalar 212 to scale the aggregated results based on a predetermined scaling factor. For example, scalar 212 may be configured to scale the aggregated results from aggregator 210 on the percentage scale or the CIR scale. The output from scalar 212 may be provided to truncator 214. Truncator 214 may truncate the scaled aggregated results with a predetermined limit. For example, if the aggregated results are scaled on the percentage scale, then truncator 214 may truncate the scaled aggregated results to not exceed 100%. If the aggregated results are scaled on the CIR scale, then truncator 214 may truncate the scaled aggregated results to not exceed −19.5 dB.

Figure 6:
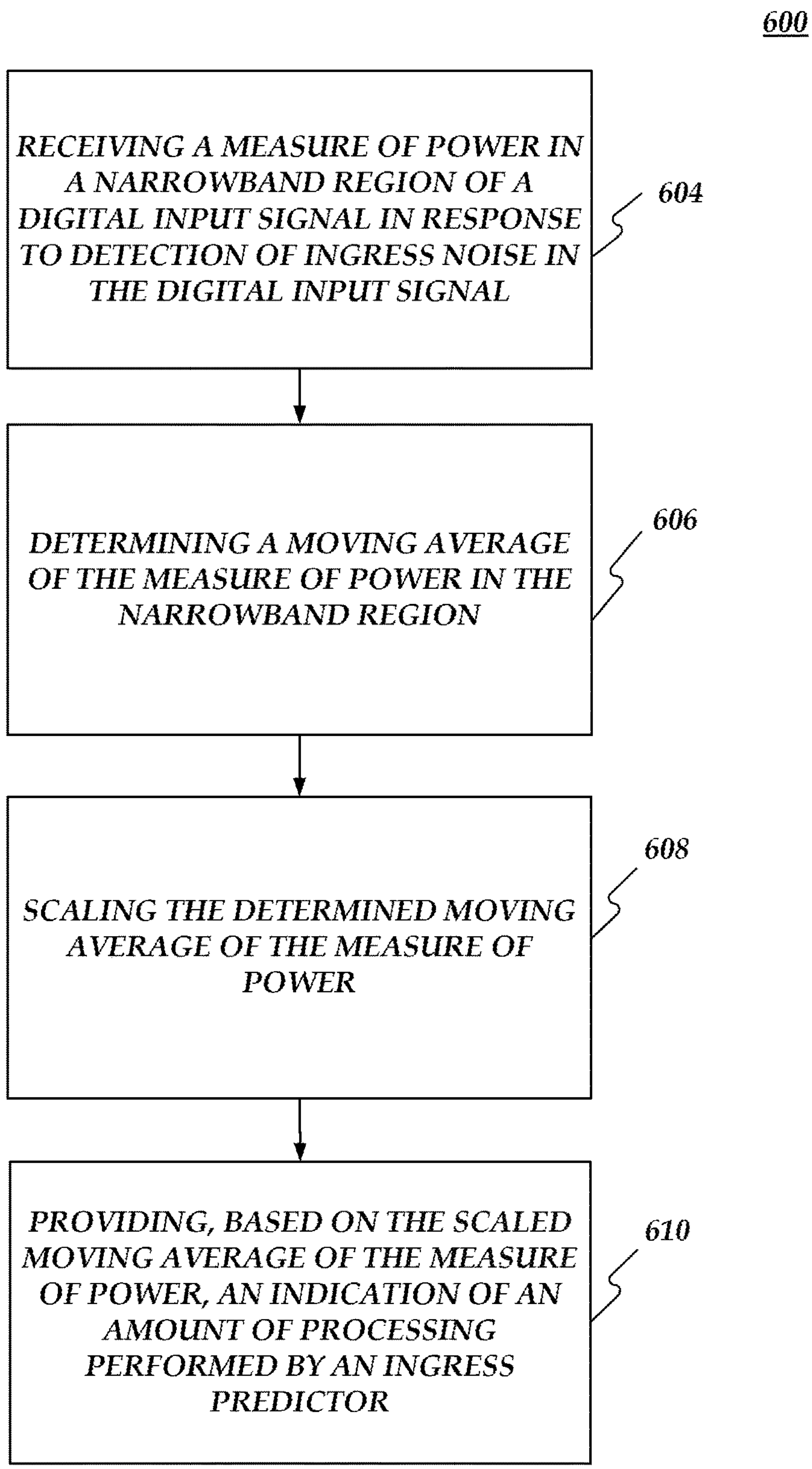
FIG. 6 is a flow diagram of a method to manage narrowband ingress on a cable plant in accordance with at least one example embodiment.

FIG. 6 is a flow chart setting forth the general operations involved in a method 600 consistent with an embodiment of the disclosure for providing an indication of processing performed by ingress predictor 84 in predicting ingress noise from the input signal. Method 600 may be implemented using predictor tachometer 106 described above with respect to FIG. 3. Ways to implement the operations of method 600 will be described in greater detail below.

In method 600, at operation 604, a measure of power in a narrowband region of a digital input signal may be received in response to detection of ingress noise in the digital input signal. For example, moving average block 304 may receive the measure of power from power monitor 302. Power monitor 302 may include a math function, such as least mean square, to measure power in the narrowband region of the digital input signal.

A moving average block in operation 606 may determine a moving average of the measure of power in the narrowband region. For example, moving average block 304 may compute a moving average of the narrow band spectral power for a predetermined time period (e.g. a time averaged power measurement). The predetermined time period may be provided in form of trigger by trigger counter 308.

In operation 608 of method 600, saturation block 306 may scale the determined moving average. For example, saturation block 306 may scale the determined moving average based on a predetermined scaling factor on a percentage or a CIR scale.

In operation 610, based on the scaled moving average of the measure of power, an indication of an amount of processing performed by ingress predictor 84 may be provided. For example, the indication may be provided on the percentage scale or on the CIR scale by predictor tachometer 106.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' operations may be modified in any manner, including by reordering operations and/or inserting or deleting operations, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving a measure of power in a narrowband region of a digital input signal in response to detection of ingress noise in the digital input signal;

determining a moving average of the measure of power in the narrowband region for a predetermined time period provided by a trigger counter;

scaling, by a programmable saturation block, the determined moving average of the measure of power based on a predetermined scaling factor on a Carrier to Interference Ratio (CIR) scale;

providing, based on the scaled moving average of the measure of power, an indication of an amount of processing performed by an ingress predictor;

moving an upstream channel to another frequency region based on the indication of an amount of processing performed by an ingress predictor;

scheduling a quiet time on the narrowband region for spectrum analysis when the amount of processing performed is greater than a predetermined threshold;

determining a center frequency of the narrowband region; and scheduling spectrum analysis to the center frequency.

2. The method of claim 1, wherein receiving the measure of power comprises calculating the measure of power using a least mean square function.

3. The method of claim 1, wherein determining the moving average of the measure of power in the narrowband region comprises determining the moving average for a predetermined time period.

4. The method of claim 1, wherein determining the moving average of the measure of power in the narrowband region comprises determining the moving average for a duration count corresponding to a total number of clock cycles spanning between a beginning and an end of the ingress noise.

5. The method of claim 1, wherein scaling the determined moving average of the measure of power comprises scaling the determined moving average of the measure of power with a predetermined scaling factor.

6. The method of claim 1, wherein providing the indication comprises providing the indication on a percentage scale wherein the maximum value on the percentage scale corresponds to an upper limit of a range for the ingress predictor.

7. The method of claim 1, wherein providing the indication comprises providing the indication on a percentage scale wherein the maximum value on the percentage scale corresponds to a carrier to interference ratio (CIR) value of +10 dB.

8. A system comprising:

a memory storage; and a processing unit coupled to the memory storage, wherein the processing unit is operative to:

receive a measure of power in a narrowband region of a digital input signal in response to detection of ingress noise in the digital input signal;

determine a moving average of the measure of power in the narrowband region;

scale the determined moving average of the measure of power;

provide, based on the scaled moving average of the measure of power, an indication of an amount of processing performed by an ingress predictor;

provide an indication of an overall processing performed by a demodulator in removing the ingress noise based on the indication of an amount of processing performed by an ingress predictor; and move an upstream channel to another frequency region based on the indication of an amount of processing performed by an ingress predictor;

schedule a quiet time on the narrowband region for spectrum analysis when the amount of processing performed is greater than a predetermined threshold;

determine a center frequency of the narrowband region; and schedule spectrum analysis to the center frequency.

9. The system of claim 8, wherein the processing unit being operative to receive the measure of power comprises the processing unit being operative to calculate the measure of power using a least mean square function.

10. The system of claim 8, wherein the processing unit being operative to determine the moving average of the measure of power in the narrowband region comprises the processing unit being operative to determine the moving average for a predetermined time period.

11. The system of claim 8, wherein the processing unit being operative to determine the moving average of the measure of power in the narrowband region comprises the processing unit being operative to determine the moving average for a duration count corresponding to a total number of clock cycles spanning between a beginning and an end of the ingress noise.

12. The system of claim 8, wherein the processing unit being operative to scale the determined moving average of the measure of power comprises the processing unit being operative to scale the determined moving average of the measure of power with a predetermined scaling factor.

13. The system of claim 8, wherein the processing unit being operative to provide the indication comprises the processing unit being operative to provide the indication on a percentage scale wherein the maximum value on the percentage scale corresponds to an upper limit of a range for the ingress predictor.

14. The system of claim 8, wherein the processing unit being operative to provide the indication comprises the processing unit being operative to provide the indication on a percentage scale wherein the maximum value on the percentage scale corresponds to a carrier to interference ratio (CIR) value of +10 dB.

15. A non-transitory computer-readable medium that stores a set of instructions which when executed perform a method comprising:

receiving a measure of power in a narrowband region of a digital input signal in response to detection of ingress noise in the digital input signal;

determining a moving average of the measure of power in the narrowband region;

scaling the determined moving average of the measure of power;

providing, based on the scaled moving average of the measure of power, an indication of an amount of processing performed by an ingress predictor;

providing an indication of an overall processing performed by a demodulator in removing the ingress noise based on the indication of an amount of processing performed by an ingress predictor;

moving an upstream channel to another frequency region based on the indication of an amount of processing performed by an ingress predictor;

scheduling a quiet time on the narrowband region for spectrum analysis when the amount of processing performed is greater than a predetermined threshold;

determining a center frequency of the narrowband region; and scheduling spectrum analysis to the center frequency.

16. The non-transitory computer-readable medium of claim 15, wherein receiving the measure of power comprises calculating the measure of power using a least mean square function.

17. The non-transitory computer-readable medium of claim 15, wherein determining the moving average of the measure of power in the narrowband region comprises determining the moving average for a predetermined time period.

18. The non-transitory computer-readable medium of claim 15, wherein determining the moving average of the measure of power in the narrowband region comprises determining the moving average for a duration count corresponding to a total number of clock cycles spanning between a beginning and an end of the ingress noise.

19. The non-transitory computer-readable medium of claim 15, wherein scaling the determined moving average of the measure of power comprises scaling the determined moving average of the measure of power with a predetermined scaling factor.

20. The non-transitory computer-readable medium of claim 15, wherein providing the indication comprises providing the indication on a percentage scale wherein the maximum value on the percentage scale corresponds to an upper limit of a range for the ingress predictor.

* * * * *